Nov. 5, 1968     A. D. STRUBLE, JR     3,409,061
ALL-PLASTIC, NON-RIGID CRYOGENIC CONTAINER
Original Filed Sept. 18, 1964     2 Sheets-Sheet 1
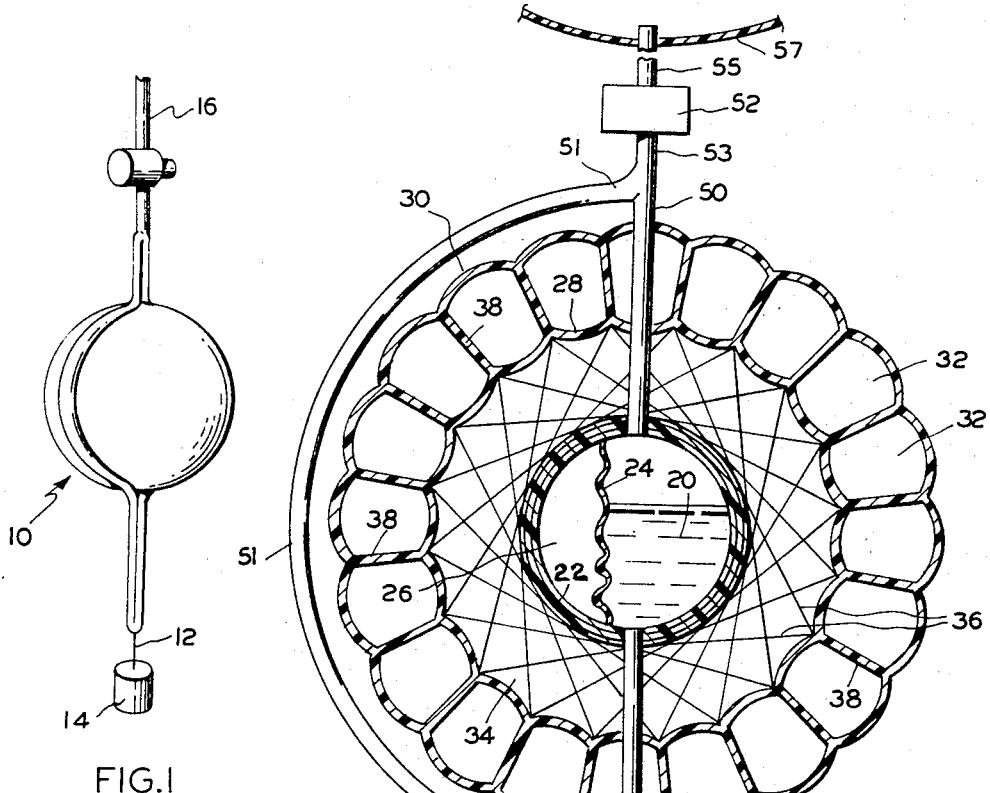
FIG.1
FIG.2
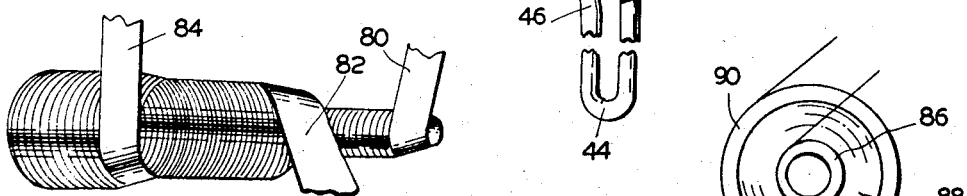
FIG.8
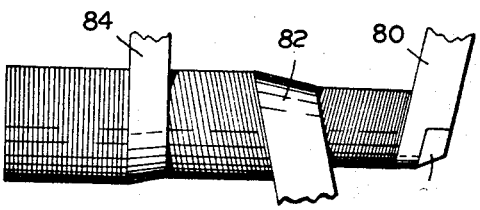
FIG.10
FIG.9

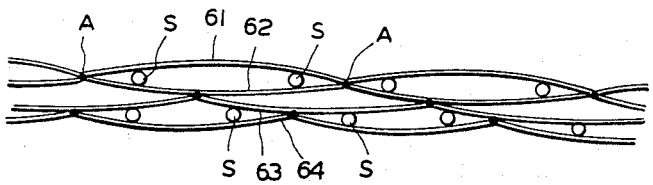
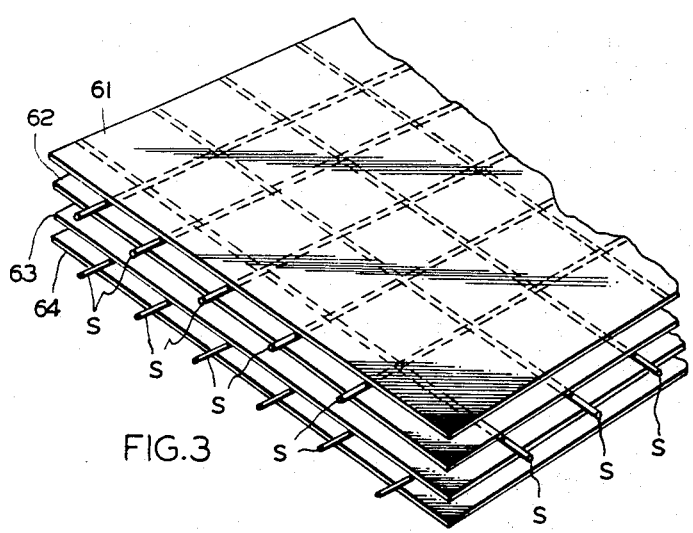
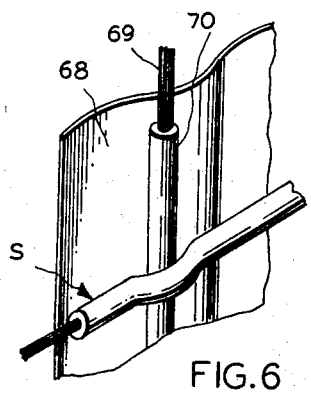
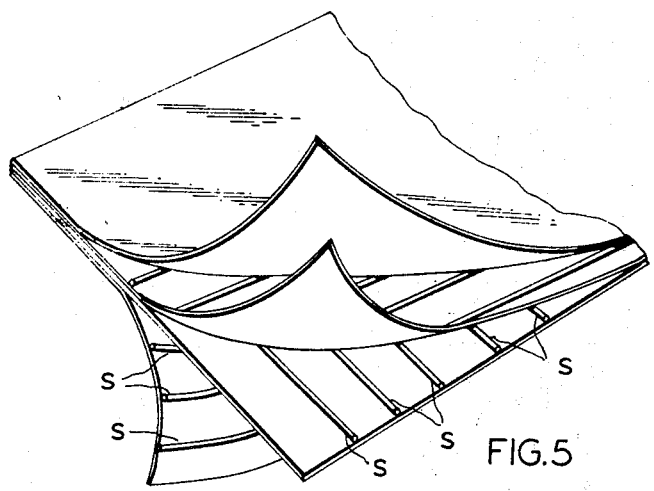
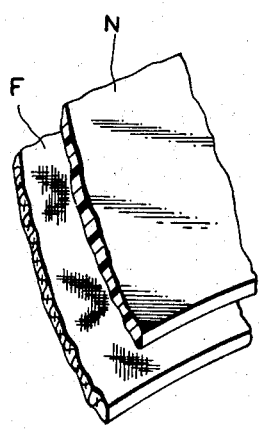

United States Patent Office 3,409,061
Patented Nov. 5, 1968

3,409,061
ALL-PLASTIC, NON-RIGID CRYOGENIC CONTAINER
Arthur D. Struble, Jr., Torrance, Calif.
(2101 Rosita Place, Palos Verdes, Calif. 90274)
Continuation of application Ser. No. 397,436, Sept. 18, 1964. This application Mar. 6, 1967, Ser. No. 621,068
2 Claims. (Cl. 150—.5)

ABSTRACT OF THE DISCLOSURE

Cryogenic vessel formed of an inner reservoir containing the cryogenic material and surrounded by a spaced hollow outer flexible wall filled with a gas under pressure. The space between the inner reservoir and the gas filled outer flexible wall being maintained under conditions which are as near vacuum as possible.

---

This invention generally pertains to an improved container for cryogenic liquids and gases that can either be used in conjunction with apparatus such as a balloon, or for other purposes.

This application is a continuation of application Serial Number 397,436 filed Sept. 18, 1964, now abandoned.

FIGURE 1 is a perspective view of a cryogenic container in accordance with this invention;

FIGURE 2 is a cross sectional view of the cryogenic container shown in FIGURE 1;

FIGURE 3 is a perspective view of a multi-layer arrangement in accordance with this invention;

FIGURE 4 is a side view of a multi-layer arrangement in accordance with this invention;

FIGURE 5 is an alternative perspective view of a multi-layer arrangement in accordance with this invention;

FIGURE 6 is a perspective view of another embodimention of the invention showing the arrangement of strengthening members;

FIGURE 7 is a fragmentary perspective view of a multi-layer arrangement in accordance with this invention;

FIGURE 9 is an end view showing a plurality of wound section;

FIGURES 8 and 10 are perspective views showing alternative embodiments of wound sections in accordance with this invention.

In broad outline, FIGURE 1 shows an arrangement comprising a cryogenic container 10, a lower cable 12 leading to a payload 14, and an upper cable 16 leading to a balloon (not shown).

FIGURE 2 is a cross-sectional view of the cryogenic container 10 shown in FIGURE 1. In FIGURE 2, a reservoir of cryogenic liquid (such as liquid hydrogen 20) is shown located within a generally spherical envelope 22. A bladder membrane 24 partially confines the reservoir of liquid hydrogen and a gas under pressure is maintained within the chamber 26. The particular construction of the envelope 22 will be described more fully hereinafter.

Surrounding envelope 22 are two outer envelopes 28 and 30 respectively. Envelopes 28 and 30 are generally spherical and confine between them (i.e. in chambers 32) a gas under pressure.

The space 34 between the interior side of envelope 28 and the exterior side of envelope 22 is maintained under conditions which are as near to vacuum as possible.

The envelope 22 is maintained approximately centrally within envelope 28 by means of a plurality of supporting cables or struts 36. The outward movement of envelopes 28 and 30 with respect to each other is limited by a plurality of tie members 38 disposed at a plurality of points around the circumference of each envelope.

It will be noted that on the lower side of the reservoir 20 a conduit 40 is provided for withdrawing liquid material from the reservoir. This conduit 40 is controlled by a valve 42 that may be either manually or remotely controlled. The conduit preferably reverses itself (as shown at bend 44) so that when the valve 42 is turned to permit liquid to flow downwardly into the reversed section 44 the liquid will reverse its direction and go upwardly through conduit leg 46. The liquid will usually turn to a gas as it rises upwardly in conduit leg 46. The gas passes upwardly through conduit leg 46, through conduit portion 51 and finally into conduit 53. Conduit 50 is connected to the upper boil-off portion of the reservoir and the gas exiting through both conduit 50 and conduit 46 can be used to power a generator 52. The gas passing through the generator 52 can thereafter pass into conduit 55 and be used to inflate or to super-pressure a balloon 57.

The construction of the envelope 22 is exceedingly important in accordance with this invention. It is not possible to simply use a thick solid layer of plastic material since a solid thick layer of plastic material will crack under stress at the very low temperatures employed. In accordance with this invention, the envelope 22 consists of a plurality of layers of very thin plastic material, such layers being attached together over only a very small fraction of their abutting surface areas. There are a number of ways in which such a multi-laminate can be produced.

For example, FIGURE 3 illustrates an arrangement wherein there are four layers of very thin plastic material that have a thickness ⅓ mil or less and preferably a thickness of about ⅒ mil. In this figure, it will be seen that between the adjacent plastic layers 61, 62, 63 and 64 there are interposed a plurality of spaced apart strength members S. The plastic sheets 61–64 may consists of polyethylene, Mylar, polypropylene or the like and the strength members may consists of Dacron, Mylar, Nylon, polypropylene, polyethylene, Fiberglas or the like. The strength members are preferably between about 15 and 30 denier. The strength members S can be arranged in a number of different ways and as shown in FIGURE 3 alternating vertical groups of strength members are preferbaly disposed at right angles to each other. In the arrangement shown in FIGURE 3, the adjacent plastic layers 61–64 are either joined directly to each other at spaced apart points or they are connected indirectly to each other by having each sheet connected to the strength members S that lie between the sheets of thin plastic material. Connection may be by means of adhesive, fusion, pressure welding, etc.

FIGURE 4 is a cross sectional view showing how the layers of material in FIGURE 3 could be joined together by spots of adhesives or heat fusion points A located at spaced apart intervals. It will be noted in FIGURE 4 that the spots of adhesive are preferably not vertically aligned. It will also be noted in FIGURE 4 that the fiber stringers or strength members S are not actually joined to either of the adjacent plastic layers. However, they can be if so desired.

Referring now to FIGURE 5, it will be seen that in another arangement consisting of four plies the strength members S are bonded directly to the sheets and the sheets themselves do not need to be fused or adhered together in the manner shown in FIGURE 4. When using an arrangement such as shown in FIGURE 5 it is preferably to heat-seal the sheets of plastic material to both sides of the intervening strength members.

FIGURE 6 illustrates still another embodiment of the invention. In some instances it may not be easy to bond the sheets of plastic material to the intervening string-like strength members due to the different nature of the materials involved. For instance, difficulties may be encountered if the plastic sheet 68 is polyethylene and the strength members S are Dacron. This problem can be solved by coating the Dacron fibers 69 with a polyethylene coating 70, and then bonding.

FIGURE 7 shows a multi-layer material which is particularly useful as a balloon envelope material 57 (see FIGURE 2). This multi-layer material consists of a layer of fabric material F (such as woven nylon) and a layer of neoprene N. The fabric material is porous but gives strength. The neoprene has little strength, but is quite effective in preventing the escape of gas.

The cryogenic container described above is not radar reflective, which makes it quite useful in connection with military reconnaissance balloon systems.

FIGURE 8-10 illustrate a novel piping construction which is particularly useful in connection with cryogenic liquids and with the invention shown in FIGURES 1-6. In the particular embodiment shown in FIGURE 8-10, the pipe consists of a plurality of concentric wound sections. Each wound section is composed of strips of very thin, flexible material. The strips in each of the sections can be identical or each of the strips can differ in one or more respects. Each strip preferably consists of a plastic material, such as polyethylene, polypropylene, polyvinyl, nylon, Mylar, etc. However, at least one of the thin layers could be composed of metallic material, such as aluminum foil, tin foil, or the like. In FIGURES 8 and 9 an inner spirally wound inner section 80 is shown; which is in turn surrounded by an intermediate spirally wound section 82; which in turn is covered by an outer spirally wound section 84. The spiral sections are preferably wound in opposite directions relative to each other in the manner shown, but this is not absolutely necessary.

The plurality of wound sections are preferably wound with varying degrees of tightness. For example, FIGURE 9 illustrates an embodiment having (a) a tightly wound inner core wherein the layers are partially or entirely fused to each other, (b) a relatively loosely wound intermediate section 88 and (c) and outer layer 90 that serves as a protective strength cover. Each wrapped section can be composed of narrow strips of plastic having the same thickness, but the strips are preferably of different thicknesses. Also the narrow strips of plastic can be reinforced with thread members (composed of either textiles, plastic or metal). The plastic strips can also be coated with a thin layer of plastic if desired.

As shown in FIGURE 10, the turns in each winding can be caused to adhere or bond to each other by means of an adhesive 99, or by thermal fusion, brazing, welding, etc.

Pipes constructed in the manner set forth above have superior qualities compared to conventional piping. After repeated use, pipes made of metal will usually eventually crack, which means that they have a very limited life. In contrast, my piping provides excellent insulating characteristics and excellent resistance to cracking even after repeated use. When wound properly my pipe has sufficient strength to make it quite rigid so that it can easily be made to support itself, plus handling high hydrostatic or gaseous pressures. The ability of the pipe to expand and contract in the several layers relieves the thermal stress that are the cause of thick-wall piping failures. The materials which I use have very low cold brittleness characteristics and the bending stresses normally associated with handling cryogenic materials are minimized because of the very thin gauge material used.

What is claimed is:
1. An improved container comprising in combination:
 (a) a walled reservoir adapted to contain a reservoir cryogenic liquid;
 (b) said wall reservoir being surrounded by an inflated chamber consisting of inner and outer walls that have limited movement with respect to each other;
 (c) the exterior of said walled reservoir being positioned inwardly from the inner wall of inflated chamber by spacing means;
 (d) the pressure between the outer side of said inner wall and the inner side of said outer wall of said inflated chamber being greater than atmospheric;
 (e) the pressure between the exterior side of said walled reservoir and the interior side of the inner wall of said inflated chamber being less than atmospheric; and
 (f) at least one opening in said wall reservoir for the passage of cryogenic material.

2. An improved container comprising in combination:
 (a) a walled reservoir adapted to contain a reservoir cryogenic liquid, said walled reservoir comprising a multi-layer wall construction comprising:
  (1) a plurality of sheets of plastic material;
  (2) the thickness of said sheets being less than about ½ mil but not less than about 1/10 mil;
  (3) a plurality of thread-like strength members being interposed between adjacent sheets at spaced apart intervals;
  (4) said sheets and said strength members being bonded together into a united whole by spaced apart adhesion means;
 (b) said walled reservoir being surrounded by an inflated chamber consisting of inner and outer walls that have limited movement with respect to each other;
 (c) the exterior of said walled reservoir being positioned inwardly from the inner wall of inflated chamber by spacing means;
 (d) the pressure between the outer side of said inner wall and the inner side of said outer wall of said inflated chamber being greater than atmospheric;
 (e) the pressure between the exterior side of said walled reservoir and the interior side of the inner wall of said inflated chamber being less than atmospheric; and
 (f) at least one opening in said walled reservoir for the passage of cryogenic material.

References Cited

UNITED STATES PATENTS

| | | | |
|---|---|---|---|
| 2,028,670 | 1/1936 | Hoshing | 161—148 |
| 2,030,746 | 2/1936 | Gallingan et al. | 161—148 |
| 2,639,248 | 5/1953 | Overholt | 161—89 |
| 3,001,683 | 10/1961 | Buckhold et al. | 220—15 |
| 3,072,512 | 1/1963 | Dalle | 161—89 |
| 3,155,265 | 11/1963 | Reese | 220—15 |

FOREIGN PATENTS 1,273,907  9/1961  France.

WILLIAM T. DIXSON, Jr., *Primary Examiner.*

J. R. LECLAIR, *Examiner.*